United States Patent Office.

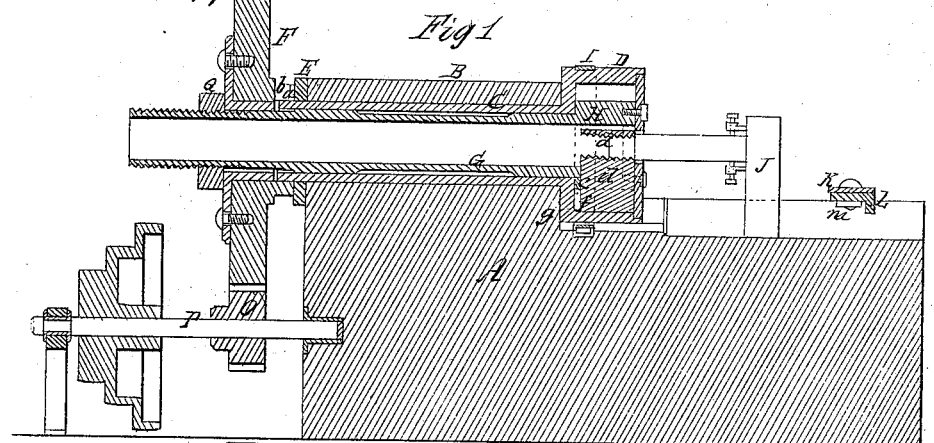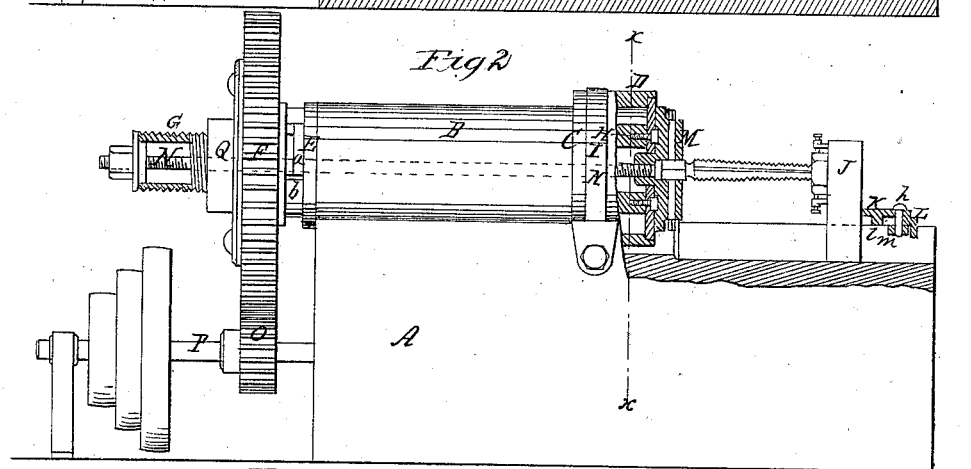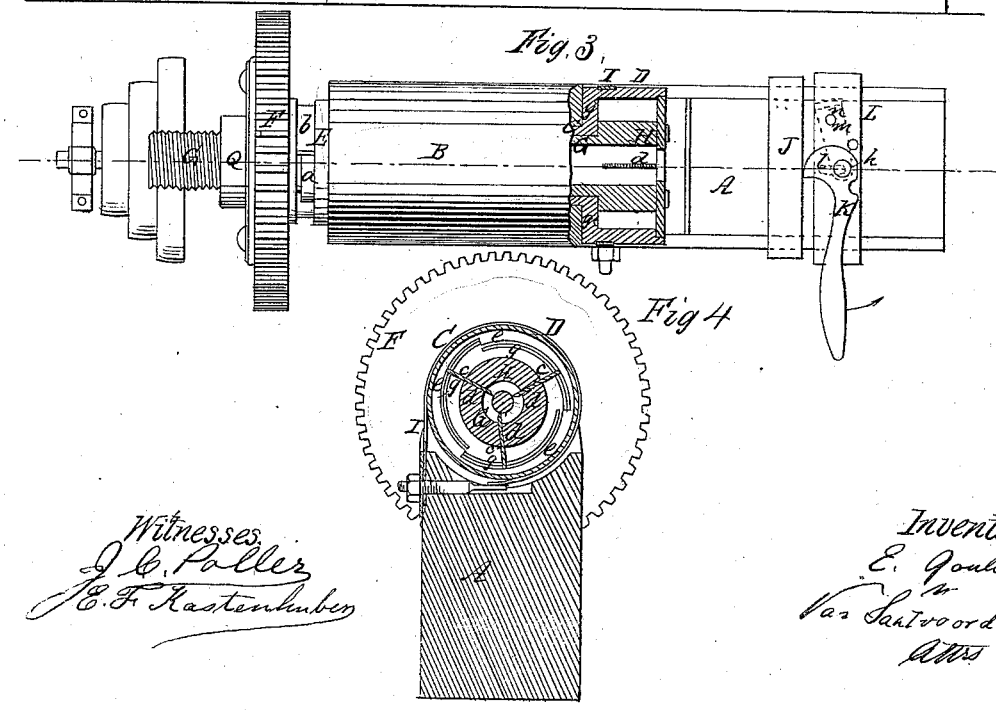

EZRA GOULD, OF NEWARK, NEW JERSEY.

Letters Patent No. 79,971, dated July 14, 1868.

IMPROVED SCREW-THREADING MACHINE.

*The Schedule referred to in these Letters Patent and making part of the same.*

TO ALL WHOM IT MAY CONCERN:

Be it known that I, EZRA GOULD, of Newark, in the county of Essex, in the State of New Jersey, have invented a new and improved Machine for Cutting Threads on Bolts and Nuts; and I hereby declare the following to be a full, clear, and exact description, enabling those skilled in the art to make and use the same, reference being had to the accompanying drawing, forming part of this specification, in which drawing—

Figure 1 represents a longitudinal section of this invention without the chuck for cutting nuts.

Figure 2 is a similar section of the same with the chuck for cutting nuts.

Figure 3 is a sectional plan thereof.

Figure 4 is a transverse section thereof, the line $x\ x$, in fig. 2, indicating the plane of section.

Similar letters indicate corresponding parts.

This invention relates to a machine for cutting threads on bolts and nuts, which is principally composed of two hollow spindles, one working inside the other, and connected by a clutch, which permits the inner spindle to make a portion of a revolution before the outer spindle is compelled to move with it. To one end of the inner spindle is secured a chuck, provided with radial grooves or mortises, into which the dies are fitted, and its other end is provided with a screw-thread and nut, which serve to hold the dies in their proper place. By releasing this nut, the inner spindle can be brought in such a position that the dies can be taken out.

The outer ends of the dies work against cams in the interior of an open head secured to the end of the outer spindle, so that, by turning the inner spindle in the proper direction independent of the outer spindle, the dies are gradually forced in towards the common centre of the two spindles. The distance to which the dies are moved is determined by the clutch, which permits the inner spindle to make a partial revolution independent of the outer spindle. This outer spindle is retained by a friction-strap, which is adjusted so that it prevents said spindle being moved by the friction of the inner spindle. For cutting nuts, an additional chuck is secured to the end of the inner spindle by a screw-rod passing through said spindle. The bolt to be cut, or the nut to be tapped, is secured in a sliding head, which is forced up towards the chuck containing the dies or the tap by a clutch-lever, the construction of which will be hereinafter more fully described.

A represents a frame, from which rises a head-block, B, that forms the bearing for a hollow spindle, C. One end of this spindle forms an open head, D, and on its opposite end is secured a disk, E, which is provided with a segmental projection, $a$, to engage with a similar projection, $b$, on the hub of a cog-wheel, F, which is mounted on the end of a spindle, G. This spindle is also hollow, and it extends through the main spindle C, being furnished with a chuck, H, that is turned off to fit into the open head, D, of the main spindle.

Said chuck is provided with radial slots or mortises, $c$, to receive the dies $d$. The outer ends of these dies bear against cams $e$, in the interior of the head, D; and these cams are of such a shape that, by turning the inner spindle in the proper direction, independent of the outer spindle, the dies are forced in towards the common centre of the two spindles, the required distance being regulated by the segmental projections $a\ b$. From the inner edges of the dies project pins $f$, which catch into cam-grooves $g$, in the inner surface of the head, D; and these cam-grooves are so shaped that, by turning the inner spindle in the proper direction independent of the outer spindle, the dies are opened, and said cam-grooves are arranged in such relation to the cams $e$ that, by turning the inner spindle in one direction, the dies will close, and, by turning it in the opposite direction, the dies will open. The amount of motion allowed to the inner spindle, independent of the outer spindle, is determined by the segmental projections $a\ b$, on the disk E and cog-wheel F, said projections being so proportioned that, when the dies have closed to the desired distance, the projection $b$ of the wheel will strike the projection $a$ of the disk, and the outer spindle C will then be carried along, and be caused to turn with the inner spindle. By adjusting the cog-wheel F, with its projection $b$, the time when the outer spindle is carried forward with the inner spindle can be changed. By these means, the dies are firmly retained in their closed position, and a bolt introduced between them is cut uniformly to any desired distance. By reversing the motion of the inner spindle, the projection $a$ is relieved from the action of the projection $b$, and the outer spindle remains at rest until the dies have opened to the required distance. At that point, the projection $b$ comes again in contact with the projection $a$, and the outer spindle is carried along with the inner spindle.

The head, D, on the spindle C is subjected to the action of a friction-strap, I, which is so adjusted that it prevents said spindle from turning by the mere friction of the inner spindle.

The bolt on which the thread is to be cut is secured in a head-block, J, which slides on suitable ways formed by the frame A, and which is forced towards the dies by a lever, K. This lever is connected to a slide, L, which is fitted to the guide-ways of the frame A, the connection between the lever and the slide being effected by a pivot, $h$, which passes through an oblong slot, $l$, in the slide, and connects with a lever-jaw, $m$, which is situated under the slide, and has its fulcrum on a pivot, $n$.

When the lever K is turned in the direction of the arrow marked near it in fig. 3, the slide L becomes loose, and can be moved freely on the guide-ways; but, when the slide is brought close up to the head-block J, and the lever K is gradually brought into the position shown in fig. 3, the lever-jaw $m$ clamps the guide-ways of the frame, and retains the slide L firmly in position, and, at the same time, the toe of the lever K bears against the head-block J, and forces the same up towards the chuck H. By these means, the bolt is made to enter the dies. As soon as the dies begin to cut, they draw the bolt in automatically. For tapping nuts, I secure, to the end of the inner spindle G, a chuck, M, (see fig. 2,) which is provided with suitable jaws, between which the tap can be secured. Said chuck is fastened to the spindle by a screw-rod, N, which extends clear through the spindle, and screws into a thread cut into a tubular projection at the inner surface of the chuck. Suitable studs or projections, rising from the outer face of the chuck H, and catching in corresponding cavities in the inner surface of the chuck M, prevent this latter chuck from turning round when the rod N is screwed in. The nut to be tapped is secured in the head-block J, and forced up against the tap by the lever K.

The motion of the spindle G is produced by a pinion, O, which gears into the cog-wheel F, and which is mounted in a shaft, P, to which the required motion is imparted by a belt or any other suitable means; and the cog-wheel F is retained in position by a nut, Q, which screws on the end of the spindle G. By unscrewing this nut a short distance, the spindle G can be pushed out far enough to allow of taking out or putting in the dies $d$.

By this arrangement, the operation of cutting threads on bolts or in nuts is materially facilitated.

Having thus described my invention, what I claim as new, and desire to secure by Letters Patent, is—

1. The arrangement, herein described, of the driving-wheel F, concentric spindles G C, and projections $a$ $b$, for the purpose set forth.

2. The combination of the lever K and slide L, secured one to the other by a pivot, $h$, which moves in a slot, $l$, with the lever-jaw $m$, frame A, and head-block J, all constructed, arranged, and operating substantially as and for the purpose described.

EZRA GOULD.

Witnesses:
F. H. GOULD,
C. HALSEY CANFIELD.